(12) United States Patent
Giladi

(10) Patent No.: US 12,689,778 B2
(45) Date of Patent: *Jul. 21, 2026

(54) SYSTEMS AND METHODS FOR GENERALIZED HTTP HEADERS IN DYNAMIC ADAPTIVE STREAMING OVER HTTP (DASH)

(71) Applicant: InterDigital VC Holdings, Inc., Wilmington, DE (US)

(72) Inventor: Alexander Giladi, Princeton, NJ (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,363

(22) Filed: Feb. 17, 2023

(65) Prior Publication Data

US 2023/0209109 A1 Jun. 29, 2023

Related U.S. Application Data

(63) Continuation of application No. 15/550,364, filed as application No. PCT/US2016/017459 on Feb. 11, 2016, now Pat. No. 11,622,137.

(Continued)

(51) Int. Cl.
*H04N 7/173* (2011.01)
*H04L 65/612* (2022.01)
(Continued)

(52) U.S. Cl.
CPC ....... *H04N 21/2355* (2013.01); *H04L 65/612* (2022.05); *H04L 65/613* (2022.05);
(Continued)

(58) Field of Classification Search
CPC ............ H04N 21/2355; H04N 21/2381; H04L 65/612; H04L 65/613; H04L 65/65;
(Continued)

(56) References Cited

U.S. PATENT DOCUMENTS 7,990,847 B1 * 8/2011 Leroy ................. H04L 67/1001
709/227
8,495,675 B1 7/2013 Philpott et al.
(Continued)

FOREIGN PATENT DOCUMENTS

CN 102143133 A 8/2011
CN 102598688 A 7/2012
(Continued)

OTHER PUBLICATIONS

DASH Industry Forum, "Guidelines for Implementation: DASH-AVC/264 Interoperability Points", Version 2.0, Aug. 15, 2013, 47 pages.
(Continued)

*Primary Examiner* — Annan Q Shang
(74) *Attorney, Agent, or Firm* — Condo Roccia Koptiw LLP

(57) ABSTRACT

Systems and methods for streaming content are disclosed. A Media Presentation Description (MPD) may be associated with streaming content, for example, in Dynamic Adaptive Streaming Over HTTP (DASH). An MPD array comprise an element, e.g., a header element or URL, query element, which provides a name value functionality. An element may allow a request that results in insertion of custom headers. Requests may be used for retrieval of a subsegment, segment, or MPD, re-referencing of remote elements, or triggered by an event. The event may be embedded either in an MPD or in segments.

19 Claims, 8 Drawing Sheets

Related U.S. Application Data

(60) Provisional application No. 62/181,100, filed on Jun. 17, 2015, provisional application No. 62/115,128, filed on Feb. 11, 2015.

(51) Int. Cl.

| | |
|---|---|
| *H04L 65/613* | (2022.01) |
| *H04L 65/65* | (2022.01) |
| *H04L 65/70* | (2022.01) |
| *H04L 65/75* | (2022.01) |
| *H04L 65/80* | (2022.01) |
| *H04L 67/1001* | (2022.01) |
| *H04N 21/235* | (2011.01) |
| *H04N 21/2381* | (2011.01) |

(52) U.S. Cl.
CPC .............. *H04L 65/65* (2022.05); *H04L 65/70* (2022.05); *H04L 65/762* (2022.05); *H04L 65/80* (2013.01); *H04L 67/1001* (2022.05); *H04N 21/2381* (2013.01)

(58) Field of Classification Search
CPC ....... H04L 65/70; H04L 65/762; H04L 65/80; H04L 67/1001; H04L 65/752
See application file for complete search history.

(56) References Cited

U.S. PATENT DOCUMENTS

| | | | | |
|---|---|---|---|---|
| 8,526,350 | B2 * | 9/2013 | Xue | .................... H04L 12/1836 370/312 |
| 8,656,047 | B1 * | 2/2014 | Lu | ......................... H04L 63/101 709/236 |
| 9,553,918 | B1 * | 1/2017 | Manion | ................... G06F 16/40 |
| 9,590,814 | B2 | 3/2017 | Pazos et al. | |
| 2004/0167878 | A1 | 8/2004 | Doddington | |
| 2009/0276771 | A1 * | 11/2009 | Nickolov | ............... G06Q 30/04 718/1 |
| 2011/0099594 | A1 | 4/2011 | Chen et al. | |
| 2011/0231569 | A1 | 9/2011 | Luby et al. | |
| 2012/0207088 | A1 | 8/2012 | Liu et al. | |
| 2013/0007814 | A1 | 1/2013 | Cherian et al. | |
| 2013/0117413 | A1 | 5/2013 | Kaneko et al. | |
| 2013/0144714 | A1 | 6/2013 | Yuan et al. | |
| 2013/0195204 | A1 | 8/2013 | Reznik et al. | |
| 2013/0266289 | A1 | 10/2013 | Oyman | |
| 2014/0013375 | A1 | 1/2014 | Giladi | |
| 2014/0019635 | A1 * | 1/2014 | Reznik | ................ H04L 63/0428 709/231 |
| 2014/0040498 | A1 * | 2/2014 | Oyman | ............. H04W 52/0212 709/231 |
| 2014/0047071 | A1 | 2/2014 | Shehada et al. | |
| 2014/0156865 | A1 | 6/2014 | Giladi | |
| 2014/0201335 | A1 * | 7/2014 | Wang | .................... H04L 65/612 709/219 |
| 2014/0201355 | A1 * | 7/2014 | Bishnoi | ............... H04L 41/0622 709/224 |
| 2014/0207907 | A1 | 7/2014 | Wang et al. | |
| 2014/0219088 | A1 | 8/2014 | Oyman et al. | |
| 2014/0230074 | A1 | 8/2014 | Lee et al. | |
| 2014/0317308 | A1 * | 10/2014 | Zhang | ..................... H04L 65/80 709/231 |
| 2014/0366070 | A1 | 12/2014 | Lee et al. | |
| 2015/0032855 | A1 * | 1/2015 | Wang | ................... H04N 21/812 709/219 |
| 2015/0106472 | A1 | 4/2015 | Friedrich et al. | |
| 2015/0113572 | A1 | 4/2015 | Oyman | |
| 2015/0113604 | A1 * | 4/2015 | Oyman | ................... H04L 65/61 726/4 |
| 2015/0207846 | A1 * | 7/2015 | Famaey | ................ H04L 67/563 709/219 |
| 2015/0229676 | A1 | 8/2015 | Cordarai et al. | |
| 2015/0237103 | A1 | 8/2015 | Lotfallah et al. | |
| 2015/0280965 | A1 | 10/2015 | Kervadec et al. | |
| 2015/0296274 | A1 | 10/2015 | Collins et al. | |
| 2015/0341634 | A1 * | 11/2015 | Jiang | .................... H04N 19/136 375/240.02 |
| 2015/0382034 | A1 * | 12/2015 | Thangaraj | ............ H04N 21/472 709/231 |
| 2015/0382042 | A1 | 12/2015 | Wagenaar et al. | |
| 2016/0021400 | A1 | 1/2016 | Gruszka et al. | |
| 2016/0036883 | A1 * | 2/2016 | Vitthaladevuni | ....... H04L 67/02 709/219 |
| 2016/0080833 | A1 | 3/2016 | Maze et al. | |
| 2016/0127440 | A1 * | 5/2016 | Gordon | ............ H04N 21/23439 709/219 |
| 2016/0198023 | A1 | 7/2016 | Kwon et al. | |
| 2016/0241924 | A1 | 8/2016 | Kwak et al. | |
| 2016/0352793 | A1 | 12/2016 | Oh et al. | |
| 2017/0019688 | A1 | 1/2017 | Lee et al. | |
| 2017/0171575 | A1 | 6/2017 | Moon et al. | |
| 2017/0272485 | A1 * | 9/2017 | Gordon | ................. H04L 63/062 |
| 2018/0153356 | A1 | 6/2018 | Weinberg | |
| 2018/0270515 | A1 | 9/2018 | Ramaswamy et al. | |
| 2019/0238937 | A1 * | 8/2019 | Lo | .................... H04N 21/44213 |

FOREIGN PATENT DOCUMENTS

| | | |
|---|---|---|
| CN | 104040945 A | 9/2014 |
| CN | 104067628 A | 9/2014 |
| FR | 2993426 A1 | 1/2014 |
| JP | 2016-500943 A | 1/2016 |
| WO | 2014/062921 A1 | 4/2014 |

OTHER PUBLICATIONS

Giladi, "MPEG DASH: A Brief Introduction", IEEE Comsoc Mmtc E-letter, vol. 8, No. 2, Mar. 2013, pp. 23-26.

Giladi et al., "Technologies under Consideration for Dynamic Adapative Streaming over HTTP 23009, parts 1, 3, and 4", Systems Subgroup, ISO/IEC JTC1/SC29/WG11, MPEG2014/N15214, Geneva, Switzerland, Feb. 2015, 32 pages.

ISO/IEC, "Information Technology—Dynamic Adaptive Streaming over HTTP (DASH)—Part 1: Media Presentation Description and Segment Formats / Amd 2", ISO/IEC 23009-1:201x/FPDAM 2, JTC 1/SC 29 N 14624, Jul. 16, 2014, 23 pages.

ISO/IEC, "Information Technology—Dynamic Adaptive Streaming over HTTP (DASH)—Part 1: Media Presentation Description and Segment Formats", ISO/IEC 23009-1:2014, 2nd Edition, May 15, 2014, 152 pages.

ISO/IEC, "Information Technology—Dynamic Adaptive Streaming over HTTP (DASH)—Part 3: Implementation Guidelines", ISO/IEC PDTR 23009-3, ISO/IEC JTC 1/SC 29 N, Jan. 25, 2013, 62 pages.

ISO/IEC, "Information Technology—JPEG 2000 Image Coding System—Part 12: ISO Base Media File Format", ISO/IEC 14496-12:2005(E), 2005, 94 pages.

ISO/IEC, "ISO/IEC 23001-7 2nd Edition—Common Encryption in ISO Base Media File Format Files", Editor 23001-7, ISO/IEC JTC1/SC29/WG11 N14588, Sapporo, Japan, Jul. 2014, 23 pages.

ISO/IEC, "ISO/IEC FDIS 23009-4", ISO/IEC JTC1/SC29/WG11 MPEG2013/wxxxxx, Geneva, Switzerland, Jan. 2013, 34 pages.

ITU-T, "Information Technology-Generic Coding of Moving Pictures and Associated Audio Information: Systems", H.222.0, Series H: Audiovisual and Multimedia Systems, Infrastructure of Audiovisual Services—Transmission Multiplexing and Synchronization, Jun. 2012, 228 pages.

S4-140930, "TR 26.848 v1.7.0 on EMO", Huawei (Rapporteur), TSG SA4#80 Meeting, San Francisco, USA, Aug. 4-8, 2014, pp. 1-60.

S4-150022, "eDASH: Draft CR for Ad Insertion", Qualcomm Incorporated, 3GPP TSG-SA4 #84, Dubrovnik, Croatia, Jan. 26-30, 2015, 32 pages.

SCTE, "AVC Video Constraints for Cable Television, Part 1—Coding", Engineering Committee, ANSI/SCTE 128-1, 2013, 32 pages.

* cited by examiner

SYSTEMS AND METHODS FOR GENERALIZED HTTP HEADERS IN DYNAMIC ADAPTIVE STREAMING OVER HTTP (DASH)

CROSSREFERNCE TO REALTED APPLICATION

This application is a continuation application of U.S. Non-Provisional application Ser. No. 15/550,364, filed Aug. 10, 2017, which is the National Stage Entry under 35 U.S.C. § 371 of Patent Cooperation Treaty Application No. PCT/US2016/017459, filed Feb. 11, 2016, which claims priority to U.S. Provisional Patent Application No. 62/115,128, filed Feb. 11, 2015 and U.S. Provisional Patent Application No. 62/181,100, filed Jun. 17, 2015, the contents of which are hereby incorporated by reference herein.

BACKGROUND

Video-capable devices have become more common and less expensive, lunging film mobile devices to Internet set-top boxes (STBs) and network TVs to mobile devices capable of rendering high quality video. Meanwhile, network capabilities have evolved to permit high quality video delivery over the Internet.

SUMMARY

Systems and methods for obtaining streaming content are disclosed. A Media Presentation Description (MPD) file may be received. A name parameter may be determined from the MPD file. A value parameter for the name (for example associated with the name) may be determined. A request type in which to include the name and value may be determined. An output mode for a request may be determined. The request including the name and value according to the determined output mode may be sent. The streaming content may be received.

A "UrlQueryInfo" element (e.g., real-time and instantiation) may be used to provide a name/value functionality. This element may be carried at any level in an MPD (for example, MPD, Period, Adaptation Set, Representation, SubRepresentation) and may be embedded into a (e.g., any) HTTP URL that may be used for retrieving segments, resolving XLink, resolving template parameters, and/or resolving other header values.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Several market trends and technology developments have resulted in the emergence of "over-the-top" (OTT) streaming that may utilize the Internet as a delivery medium. A wide range of video-capable devices, e.g., Internet set-top boxes (STBs), network TVs and mobile devices, may render high quality video content. Improved network capabilities enable high quality video delivery over the Internet for many users.

"Closed" networks may be controlled (e.g., completely) by a multi-system operator (MSO), which may provide a predictable and consistent network environment. The Internet may provide a "best effort" environment, where bandwidth and/or latency may change. In a computer network, e.g., Internet network conditions may be volatile, especially in networks that service mobile devices. Network volatility may make dynamic adaptation to network changes attractive, for example, to provide users (e.g., customers) with a quality experience.

In an example, adaptive video streaming (e.g., rate-adaptive video streaming) may be implemented with hypertext transfer protocol (HTTP) streaming. HTTP may be used as a video transport protocol to take advantage of existing HTTP infrastructure (e.g., content distribution networks (CDNs)) and the wide availability of HTTP support on multiple platforms and devices. By using HTTP for Internet video streaming, such streaming applications and systems may be scalable. Video over HTTP may be available behind firewalls while some other implementations, such as user datagram protocol (UDP) video streaming, may be blocked by firewalls.

In HTTP adaptive streaming, an asset may be segmented, virtually and/or physically, and published to one or more CDNs. The intelligence to render the asset may reside in the client. In an example, a client may acquire information about published alternative encodings (may also be referred to herein as "representations") and the manner in which uniform resource locators (URLs) may be constructed to download a segment of an asset from a representation. An adaptive bitrate (ABR) client may observe network conditions and determine a combination of bitrate, resolution, etc., that may, provide a quality experience on the client device at a specific instance of time. Once a client determines an optimal URL to use for acquiring one or more segments, the client may issue one or more HTTP GET requests to download such segments.

Figure 1:
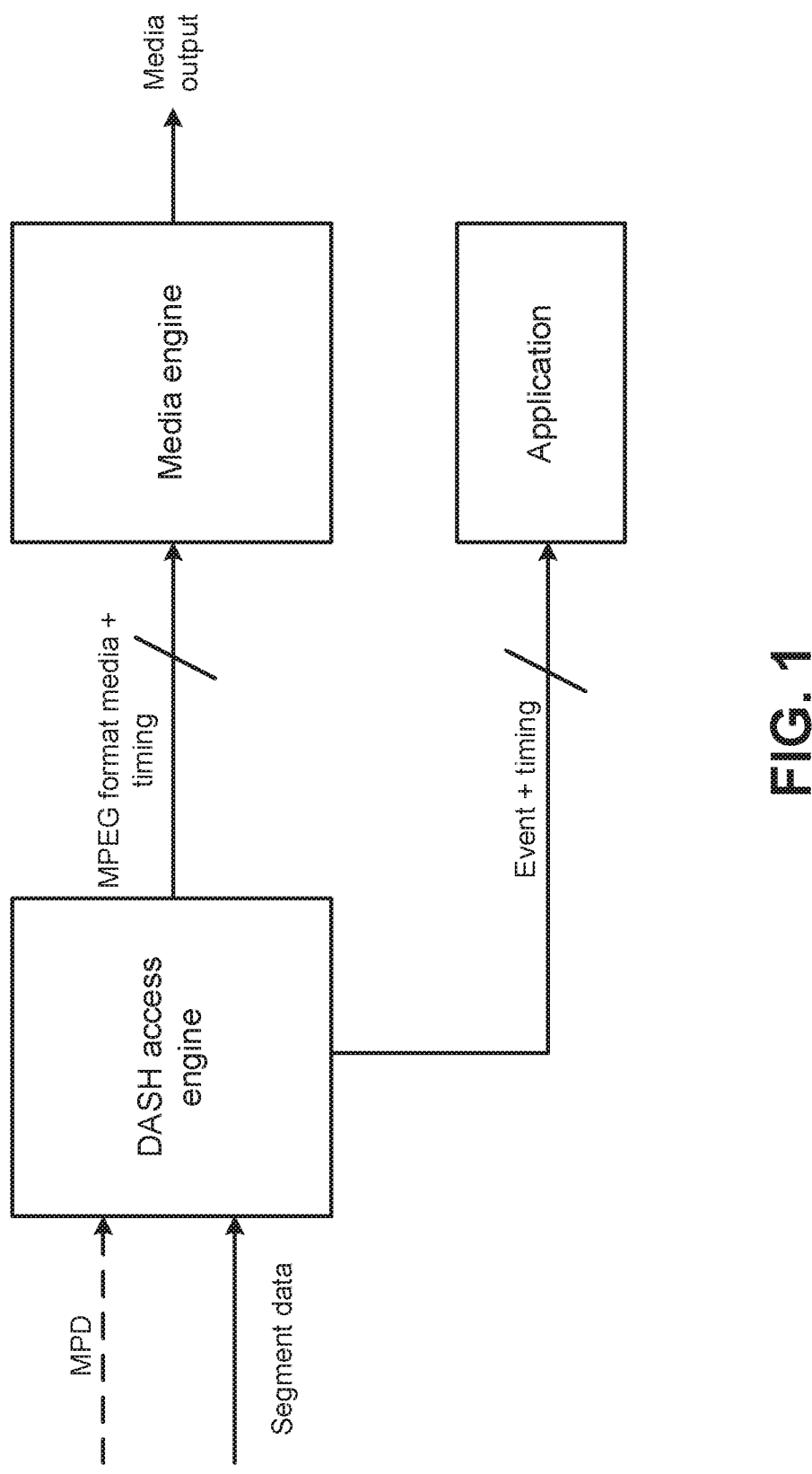
FIG. 1 illustrates an example of a DASH system model.

Dynamic adaptive streaming over HTTP (DASH) may be implemented using the HTTP/TCP/IP protocol stack. FIG. 1 illustrates an example of a DASH system model. In an example, DASH may define a manifest format, a Media Presentation Description (MPD), and segment formats for International Organization for Standardization (ISO) base media file format (BMFF) transport streams and Moving Picture Experts Group 2 (MPEG-2) transport streams. DASH may also define a set of quality metrics at network, client operation, and media presentation levels. This may facilitate an interoperable method of monitoring quality of experience and quality of service.

A representation in DASH may be defined as a single encoded version of a complete asset or a subset of the assets components. Examples of representations include ISO-BMFF representations containing to multiplexed 2.5 Mbps 720p advanced video coding (AVC) video and ISO-BMFF representations for 96 Kbps MPEG-4 advanced audio coding (AAC) audio in different languages. Alternatively, a single transport stream may contain video, audio, and subtitles and may be a single multiplexed representation. In another alternative, a combined structure may be used where, e.g., video and English audio may be a single multiplexed representation, while Spanish and Chinese audio tracks may be separate unmultiplexed representations.

A segment may be the minimal individually addressable unit of media data. A segment may be an entity that may be downloaded using URLs advertised via the MPD. An example of a media segment may be a four second part of a live broadcast that may start at playout time 0:42:38 and end at 0:42:42, and that may be available within a three minute time window. Another example may be a complete on-demand movie that may be available for the entire period for which the on-demand movie may have been licensed.

An MPD may be represented in an Extensible Markup Language (XML) document that may advertise available media and may provide information that may be used by a client to select a representation, make adaptation decisions, and/or retrieve segments from via a network. An MPD may be independent of any segments and/or may signal properties that may be used to determine whether a representation may be successfully played and the representations functional properties (e.g., whether segments start at random access points). An MPD may use a hierarchical data model to describe a complete presentation.

Representations may be considered the lowest conceptual level of such a hierarchical data model. At representation level, an MPD may signal information such as bandwidth and presentation codecs, as well as method of constructing URLs for accessing segments. Additional information may also be provided at this level, such as trick mode and random access information, layer and view information for scalable and multiview codecs, and generic schemes that may be supported by a client wishing to play a given representation.

DASH may provide flexible URL construction functionality. DASH may enable the use of a single monolithic per-segment URL and/or dynamic construction of URLs by combining parts of a URL (base URLs) that may appear at different levels of the hierarchical data model. Multiple base URLs may be used such that segments may be obtained using multi-path functionality, where segments may be requested from more than one location, which may improve performance and reliability.

An explicit list of URLs and byte ranges may consume significant resources, and may include thousands of elements per representation, for example, when short segment are used. DASH may use predefined variables (e.g., segment number, segment time, etc.) and/or printf-style syntax for dynamic construction of URLs using templates. In an example, a single line (e.g., seg_$Index%05$.ts) may express any number of segments, even if such segments may not be retrievable at the time the MPD is fetched. In an example, multi-segment representations may use templates.

Different representations of an (e.g., the same) asset and/or a (e.g., the same) component, e.g., in an un-multiplexed implementation, may be grouped into adaptation sets.

Representations within an adaptation set may render the same content and a client may switch between such representations.

An example of an adaptation set may be a collection often representations, each having video encoded in different bitrates and/or resolutions. In an example, a client may switch between each of such representations at segment or subsegment granularity, while presenting the same content to the viewer. Under some segment-level restrictions, seamless representation switching may be possible. Restrictions may be used in practical applications and may be adopted as DASH subsets, for example, by one or more standards developing organizations (SDOs). Segment restrictions may be applied, for example to representations (e.g., all representations) within an adaptation set. Bitstream switching may also be used.

A period may be a time-limited subset of a presentation. Adaptation sets may be valid within a period and adaptation sets in different periods may or may not contain similar representations (e.g., in terms of codecs, bitrates, etc.). An MPD may contain a single period for the duration of an asset. Periods may be used for ad markup, where distinct periods are dedicated to parts of the asset and to one or more advertisements.

In an example, an MPD may be an XML, document that may present a hierarchy that may start with global presentation-level properties (e.g., timing) and continue with period-level properties and adaptation sets that may be available for a period. Representations may be the lowest level of this hierarchy.

DASH may use a simplified version of XLink to load parts of an MPD (e.g., periods) in real time from a remote location. For example, when the precise timing of ad breaks is known ahead of time, ads may be obtained in real time from ad servers that may determine the appropriate ad in real time.

A dynamic MPD may change and may be periodically reloaded by a client. A static MPD may be valid for an entire presentation. Static MPDs may be used for video on-demand applications and dynamic MPDs may be used for live and personal video recorder (PVR) applications.

Media segments may be time-bounded parts of a representation. Approximate segment durations may be included in an MPD. Segment duration may or may not be the same for all segments. In an example, segment durations may be close to constant (e.g., within a 25% tolerance margin).

In a live broadcast example, an MPD may include information regarding media segments that are unavailable at the time the MPD is read by a client. Such segments may be available within a defined availability time window that may be calculated from wall-clock time and segment duration.

Index segments may be side files and/or included within media segments. Index segments may contain timing and/or random access information. Index segments may include indexes that may improve the efficient implementation of random access and trick modes. Index segments may also, or instead, be used for mow efficient bitstream switching. Indexing may be especially useful for video on demand and PVR types of applications, but may also be used in live streaming.

Several segment-level and representation-level properties may be used to implement efficient bitstream switching. DASH may include explicit functional requirements for such properties that may be expressed in an MPD in a format-independent way. Each segment format specification may contain format-level restrictions that may correspond to these requirements.

In an example, media segment i of representation R may be denoted as $S_R(i)$, and its duration may be denoted as $D(S_R(i))$. The media segments earliest presentation time may be denoted $EPT(S_R(i))$. EPT may correspond to an earliest presentation time of the segment and may not refer to a time at which a segment may be successfully played out at random access.

Efficient switching may be implemented using time alignment of segments for representations within an adaptation set. In an example, for any pair of representations $R_a$ and $R_b$ and segment i, $EPT(S_{Ra}(i)) < T(S_{Rb}(i-1)) + D(S_{Rb}(i-1))$. Combined with the property of a segment starting with a random access point of certain types, this may ensure the ability to switch at a segment border without overlapped downloads and dual decoding.

When indexing is used, it may be possible to do bitstream switching at a subsegment level as well.

Some implementations may include time alignment and random access point placement restrictions. In terms of video encoding, these restrictions may translate into encodings with matching instantaneous decoder refresh (IDR) frames at segment borders and closed groups of pictures (GOPs).

A DASH client may include an access client that may be an HTTP client, a media engine that may decode and present media provided to it, and an application to which the access client may pass events. Defined interfaces may include on-the-wire formats of an MPD and segments. Other interfaces may be implemented in various ways. FIG. 1 illustrates an exemplary DASH system model.

Timing behavior of a DASH client may be more complex than that of earlier technologies. For example, in Apple HTTP live streaming (HLS), segments mentioned in a manifest may be valid and a client may regularly poll for new manifests. In a DASH MPD example, polling may be reduced, for example, by defining an MPD update frequency and providing for the explicit calculation of segment availability.

A static MPD may be valid indefinitely while a dynamic MPD may be valid from the time it was fetched by the client for an explicitly stated refresh period. An MPD may also support versioning and it may explicitly expose its publication time.

An MPD may provide the availability time of the earliest segment of a period $T_A(0)$. Media segment n may be available starting from time $$T_A(n) = T_A(0) + \sum_{i=0}^{n-1} D(S_R(i))$$

and may be available for the duration of the time shift buffer $T_t$s, which may be explicitly set forth in the MPD. Availability window size may impact catch-up TV functionality of a DASH deployment. Segment availability time may be relied upon by an access client, for example, when segment availability time falls within an MPD validity period.

For any representation R, an MPD may declare bandwidth $B_R$. An MPD may define a global minimum buffering time $BT_{min}$. An access client may pass a segment to the media engine after $B_R \times BT_{min}$ bits have been downloaded. Given a segment that starts with a random access point, the earliest time segment n may be passed to a media engine may be $T_A(n) + T_d(n) + BT_{min}$, where $T_d(n)$ may indicate the download time of segment n. In order to minimize the delay, a DASH client may want to start the playout immediately.

Alternatively, an MPD may propose a presentation delay (e.g., as an offset from $T_A(n)$) in order to ensure synchronization between different clients. Note that tight synchronization of segment HTTP GET requests may create a "thundering herd" effect that may adversely affect the infrastructure.

MPD validity and/or segment availability may be calculated using absolute (i.e., wall-clock) time. Media time may be expressed within the segments themselves. In a live streaming example, drift may develop between the encoder and a client clock. Such drift may be addressed at the container level, where both MPEG-2 transport stream and ISO-BMFF may provide synchronization functionality.

Since HTTP is stateless and client-driven, "push"-style events may be emulated using frequent polls. In ad insertion practice in cable/IPTV systems, upcoming ad breaks may be signaled 3-8 seconds before they start. In an example, a poll-based implementation may be inefficient. An event may be used, for example, when a poll-based implementation would be inefficient.

Events may be "blobs" that may have explicit time and duration information and application-specific payloads. Inband events may be small message boxes appearing at the beginning of media segments, while MPD events may be a period-level list of timed elements. An MPD validity expiration event may identify an earliest MPD version valid after a given presentation time.

DASH may be agnostic to digital rights management (DRM) and/or may support a signaling DRM scheme and related properties within an MPD. A DRM scheme may be signaled via the "ContentProtection" descriptor and an opaque value may be passed within such a descriptor. In order to signal a DRM scheme, a unique identifier for a given scheme may be used and the meaning of the opaque value may be defined. Alternatively, a scheme-specific namespace may be used.

Common Encryption for ISO-BMFF (CENC) and/or Segment Encryption and Authentication may be used. Common encryption may define the parts of a sample that may be encrypted and how encryption metadata may be signaled within a track. The DRM module may be responsible for delivering keys to a client, based on the encryption metadata in the segment, while decryption may use Advanced. Encryption Standard Counter (AES-CTR) mode and/or Advanced Encryption Standard cipher-block chaining (AES-CBC) mode. The CENC framework may be extensible and may use other encryption algorithms. Common Encryption may be used with several commercial DRM systems.

DASH Segment Encryption and Authentication (DASH-SEA) may be agnostic to the segment format. Encryption metadata may be passed via an MPD and may not make use of inband mechanisms. For example, an MPD may contain information on a key that may be used for decryption of a given segment and how to obtain this key. A baseline system may be equivalent to one that may be defined in HLS, with AES-CBC encryption and HTTPS-based key transport. In an example, MPEG-2 transport stream media segments may be compatible with encrypted HLS segments. Other encryption algorithms and DRM systems may be used, for example, with DASH-SEA.

DASH-SEA may provide a segment authenticity framework. Such a framework may help ensure that a segment received by a client is same segment that the MPD author intended the client to receive. This may be accomplished using message authentication code (MAC) and/or digest algorithms and may prevent content modification within a network (e.g., ad replacement, altering inband events, etc.).

MPEG template mechanisms may allow the embedding of parameters into segment URLs. Embedding client-specific parameter (e.g., tokens) into the URLs may result in reduced CDN performance, for example, because the same content may be represented by multiple URLs and such URLs may tions) a single element may provide a solution for multiple header values (e.g., by comprising a list of names and/or a list of values).

In an example an element may be defined as shown in Table 1. The element may be referred to by any name. In an example, the element may be referred to as "HeaderParam."

TABLE 1

| Element or Attribute Name | Use | Description |
| --- | --- | --- |
| HeaderParam | | |
| @name | M | String specifying a header name |
| @value | O | Value |
| @clientFunctionUrn | O | URN for a method to compute the value on client side. The method may be applied to @value or a value derived from @valueUrlTemplate. @clientFunctionUrn may be a DASH URL template rather than a URL-in this case, a URL may (e.g., will) be constructed as defined for segment URLs. |
| @valueUrlTemplate | O | HTTP request to this URL may return a response with header with the name specified in the @name attribute above. The @value attribute may be treated as if it contained the value returned for this header. This may be a DASH URL template, for example, rather than a URL. A URL may be constructed, e.g., as defined for segment URLs. |
| @useInUrl | O | Specify which URL requests should carry this header. Values may be a list of "segment" (e.g., all segment URLs)", XLink (e.g., all XLink URLs), "MPD" (e.g., all MPD requests), any combination of these. By default all requests may (e.g., will) carry this header/value pair |
| @useInDomain | | List of domains to which this HTTP header may be sent (e.g., all by default). |
| @xlink:href | O | specifies a reference to a remote HeaderParam element |
| @xlink:actuate | OD default:onRequest | specifies the processing instructions, e.g., "onLoad" or "onRequest". This attribute may (e.g., shall) not be present when the @xlink:href attribute is not present. |

Legend:
For attributes: M = Mandatory, O = Optional, OD = Optional with Default Value, CM = Conditionally Mandatory.
For elements: <minOccurs> . . . <maxOccurs> (N = unbounded)
Note that the conditions may hold (e.g., only hold) without using xlink:href. Attributes (e.g., all attributes) may be (e.g., are) "optional" and <minOccurs = 0>, for example, when linking is utilized.
Elements are bold: attributes are non-bold and preceded with an @.

not be understood by the CDNs as pointing to content that has already been cached. HTTP headers may be used (e.g., alternatively) to convey information in a way that may be transparent to caches.

In an example, generalized templates may be used to provide a name/value functionality similar to the "UrlQueryInfo" element real-time and instantiation). This element may be carried at any level in an MPD (e.g., MPD, Period, AdaptationSet, Representation, SubRepresentation) and may be embedded into a (e.g., any) HTTP URL that may be used for retrieving segments, resolving XLink, resolving template parameters and/or resolving other header values.

In an example, an XML element may be embedded at a (e.g., any) level in an MPD. An XML element may comprise, for example, a name for a header variable and any combination of a value for the variable (which may be embedded in the MPD at MPD generation or XLink resolution), one or more URLs that may be used for retrieving the value in real time, and an instruction that may designate the HTTP request that may carry the header. In an example, a UrlQueryInfo element may be modified to provide this information.

While the examples discussed herein use a single element for a single header, in other examples (e.g., implementa- In an example, a parameter may be initialized at the "beginning of time." An MPD may comprise a HeaderParam element with an "@value" attribute specified. Alternatively, or in addition, a parameter may be initialized at XLink resolution time, for example, when XLink resolution occurs at a level higher than the level at which the HeaderInfo resides.

A parameter may be initialized in real-time using XLink, for example, where the response may include a HeaderParam element with "@name" and/or "@value" specified, and/or Where the response has "@name" and/or "@valueUrlTemplate" attributes present.

In an example, which may be combined with initializing a parameter in real-time using XLink as described above, a value may be retrieved using the "@valueUrlTemplate" attribute. A URL, may be constructed using any DASH URL construction methods or means, for example, when the "@valueUrlTemplate" attribute is a template. An HTTP response to a request sent to a URL may comprise a header. The header may be specified in "@rename" and a value of the header may be considered the value of the "@value" attribute.

In an example, a "clientFunctionUm" uniform resource name (URN) may be present and may specify the way a client may compute a value of "@value." Examples may include playback information (e.g., whether play, stop, rewind, etc. wee being used), function of a variable, global positioning system (GPS) coordinates, etc. "@clientFunctionUm" may be used as a function applied to a value derived in any manner set forth herein and otherwise. As an example, a digital signature or/and encryption may be applied to a value prior to the values use in a header. It is notable that techniques described herein may be applied to query parameters. As an example a URN may specify a client-side function applied to a parameter.

In an example, @clientFunctionUm may be a function that may implemented on a client. For example, a calculation of a signature (e.g., a keyed-hash message authentication code (HMAC)) of a complete segment URL may be desired for transmission in a header. In an example, a URN may be defined as "um:smth:urlsign:hmac:sha1." An "@value" attribute may be used as a key and the segment URL, may be used as a second parameter to generate a value that can be used in a header. A similar approach may be applied to URL queries.

In an example of parameters (e.g., name/value functionality), an "@name" attribute may be "x-spam-lovely-spam." In such an example, a header parameter (in this example, "spam") may be initialized from a URL. In an example where a client wishes to send a request for content to www.myserver.com/segment1.mp4, the client may calculate an HMAC and receive a result of, for example, "f0b6364359c6131e3dced0efdf95b6dec7df375d." A request may be sent to the URL "www.myserver.com/segment1.mp4," for example, with a header that includes an "x-span-lovely-spam" attribute having the resulting value (e.g., "f0b6364359c6131e3dced0cfdf95b6dec7df375d," which is the result shown above). In an example, the function um:smth:urlsign:hmac:sha1" may be defined.

Where resolution may not provide an implicit or explicit Value of "@value,", the value of "@value" may be an empty string.

Headers instantiated from the HeaderParam element may be used in the requests to which it applies according to instructions that may be present in this element. An attribute specifying a list of headers may be added to one or more elements. For example, for elements of types BaseURLType or URLType, an attribute "@headers" may be added that may include a list of headers that may be used with the specific URL or any URL that may be constructed using this element. In XLink, an "@headers" attribute may be added to the same level as XLink URLs, permitting use of specified headers. An additional attribute may be extended to more URL-containing elements.

In an example, parameters (e.g., name/value functionality) may be used in authentication where a server may provide a token to a client allowing the client access to protected material. Such a token may be provided as a header value and may be added to segment requests.

In an example, parameters (e name/value functionality) may be used in cache optimization to provide a next segment that a client may be planning to request.

In an example, parameters (e.g., name/value functionality) may be used to provide encrypted GPS information in order to determine whether a requesting device is in a geographic area that is permitted to sec the content.

In an example, parameters (e.g., name/value functionality) may be used for reporting client playback and/or network status information (e.g., buffer levels, rebuffering, metrics).

Figure 2:
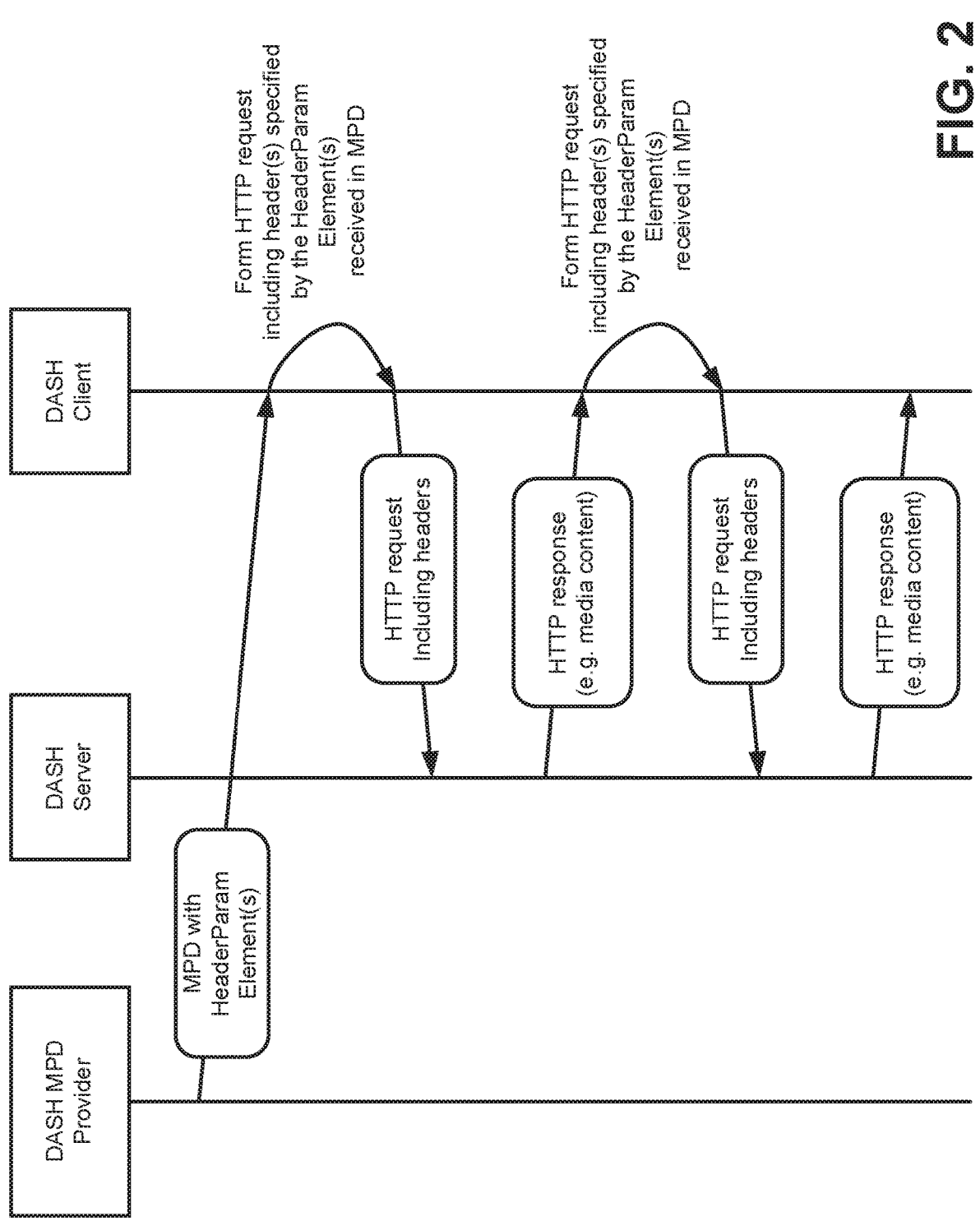
FIG. 2 is diagram showing art example of participants and an example of interaction between participants.

FIG. 2 is diagram showing an example of participants and an example of interaction between participants. FIG. 2 illustrates non-limiting, exemplary technique. A DASH MPD provider may provide an MPD to a DASH client. An MPD may comprise one or more HeaderParam elements. The DASH client may form an HTTP request, for example, based on the MPD. A header or headers may be specified by the one or more HeaderParam elements. The DASH client may send this request to a DASH server, which may respond with content. The DASH client may generate additional HTTP requests, for example, based on the MPD and the one or more HeaderParam elements and may receive additional content in response.

Figure 3:
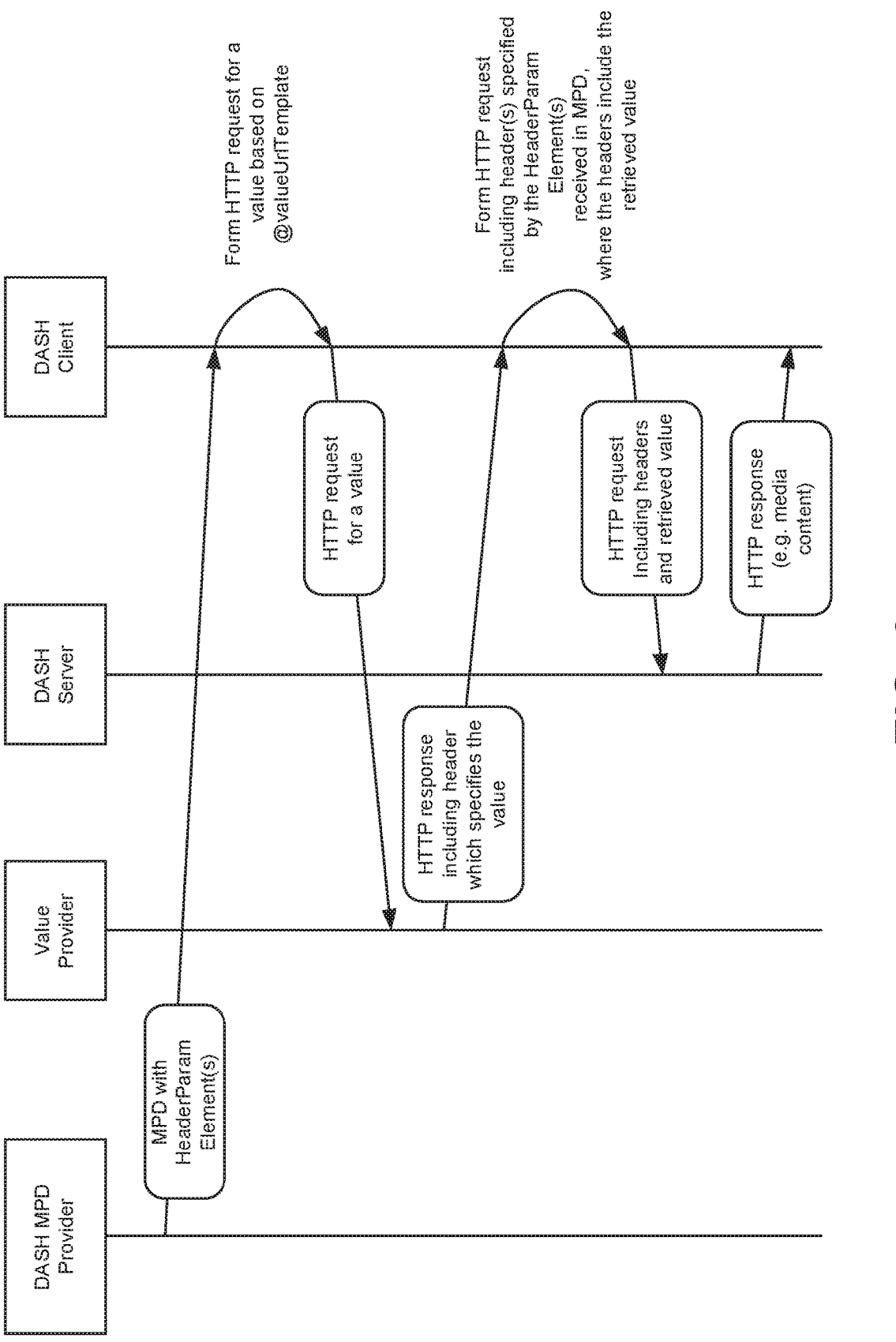
FIG. 3 is diagram showing an example of participants and an example of interaction between participants.

FIG. 3 is diagram showing an example of participants and an example of interaction between participants. FIG. 3 illustrates non-limiting, exemplary technique. A DASH MPD provider may provide an MPD that may include one or more HeaderParam elements to a DASH client. The DASH client may form an HTTP request for a value based on "@valueUrlTemplate" defined in the MPD and may send this request to value provider. A value provider may be, for example, a server that controls content authentication and/or a system that assigns identifiers (e.g., opaque client identifiers) to subscribers or to subscriber devices. The value provider may send a response to the DASH client that includes a header that specifies the value. The DASH client may form an HTTP request based on the MPD, with a header or headers specified by one or more HeaderParam elements in the MPD and that include the value received from the value provider. The DASH client may send this request to a DASH server that may respond with content. The DASH client may generate additional HTTP requests based on the MPD and the one or more HeaderParam elements and receive additional content in response.

HTTP requests made by a DASH client may carry header information, with a potential exception of an initial value request at the time a header parameter is instantiated. A DASH server, or any HTTP server and/or proxy, may use such header information for purposes such as client identification, authentication, logging, etc.

A "value provider" may be, for example, a server that may control content authentication and/or a system that may assign subscribers with client IDs (e.g., "opaque" client IDs).

A pseudocode listing is shown below that provides an example MPD that may use a HeaderParam element. The example may include a first instance of a HeaderParam element at the MPD level (e.g., the top level of the MPD structure). In the first instance of the HeaderParam element, the "name" attribute may be set to "x-dash-client-id" which may represent a unique identifier for a DASH client and/or for a user associated with a DASH client. The "valueUrlTemplate" attribute may be set to http://adserver.com/clientid, which may be a URL of a server associated with an advertising service. A DASH client may use such a URL to request a value of a "x-dash-client-id", for example, as described in regard to FIG. 3. The server associated with the advertising service may be the value provider shown in FIG. 3. The "useInUrl" attribute may be set to "xlink", indicating to the DASH client that the "x-dash-client-id" header with the value retrieved from the server may be sent in all Xlink requests. Based on the first instance of the HeaderParam element in the example shown below, the DASH client may provide the "x-dash-client-id" header with an identification of the client in the Xlink request(s) sent from the client. Such identification may be used by an advertisement provider and/or by one or more other Xlink resolvers to provide targeted advertisements to the DASH client.

The pseudocode listing shown below may include a second instance of a HeaderParam element at the period level of the MPD. In this exemplary second instance, the "name" attribute may be set to "x-dash-next-segment", which may identify a header indicating the next segment that the DASH client is planning to request (e.g., from a DASH server). The "userInUrl" attribute may be set to "segment", which may indicate to the DASH client that the "x-dash-next-segment" header may be included in segment requests. A "clientFunctionUrn" attribute may be set to "urn:org:

example:next-segment," which may identify a method or function available on the DASH client that may return an identifier of the next segment that the DASH client is planning to request.

Based on the second instance of the HeaderParam element in this example, the DASH client may provide, in one or more segment requests sent by the DASH client, an "x-dash-next-segment" header with an indication of a next segment that the client plans to request. A DASH server and/or another entity in the network may use the indication of the next segment to optimize content caching, for example.

```
<?xml version="1.0" encoding="UTF-8"?>
<MPD xmlns:xsi="http://www.w3.org/2001/XMLSchema-instance"
  xmlns="urn:mpeg:dash:schema:mpd:2011"
  xsi:schemaLocation="urn:mpeg:dash:schema:mpd:2011 DASH-MPD.xsd"
  type="dynamic"
  minimumUpdatePeriod="PT2S"
  timeShiftBufferDepth="PT600S"
  minBufferTime="PT2S"
  profiles="urn:mpeg:dash:profile:isoff-live:2011"
  availabilityStartTime="2012-12-25T15:17:50"
  mediaPresentationDuration="PT238806S">
  <!-- Use x-dash-client-id header to include client information in XLink
requests for ad content -->
  <HeaderParam name="x-dash-client-id"
valueUrlTemplate="http://adserver.com/clientid" useInUrl="xlink" />
  <BaseURL>http://cdn1.example.com/</BaseURL>
  <BaseURL>http://cdn2.example.com/</BaseURL>
  <!-- Movie -->
  <Period start="PT0.00S" duration="PT1800S" " id="M1">
    <AssetIdentifier schemeIdUri="urn:org:example:asset-id:2013"
      value="md:cid:EIDR:10.5240%2f0EFB-02CD-126E-8092-1E49-W" />
      <AdaptationSet mimeType="video/mp4" codecs="avc1.640828"
frameRate="30000/1001"
        segmentAlignment="true" startWithSAP="1">
        <BaseURL>video__1/</BaseURL>
        <SegmentTemplate timescale="90000"
initialization="$Bandwidth%/init.mp4v"
          media="$Bandwidth$/$Number%05d$.mp4v"/>
        <Representation id="v0" width="320" height="240"
bandwidth="250000"/>
        <Representation id="v1" width="640" height="480"
bandwidth="500000"/>
        <Representation id="v2" width="960" height="720"
bandwidth="1000000"/>
      </AdaptationSet>
  </Period>
  <!-- Mid-roll advertisement, passing base64url-coded SCTE 35 via XLink-->
  <Period start="PT300.00S6S" id="A1"
    xlink:href="https://adserv.com/avail.mpd?acq-
timeime=00:10:0054054000&id=1234567&
    sc35cue=DAIAAAAAAAAAAAQAAZ_I0VniQAQAgBDVUVJQAAAAH+cAAAAAA==" 
    xlink:actuate="onRequest" >
    <!-- Use x-dash-next-segment header to include next segment name for
the segment the client expects to bring request from the same server -->
      <HeaderParam name= "x-dash-next-segment"
clientFunctionUrn="urn:org:example:next-segment" useInUrl="segment" />
      <EssentialProperty schemeIdUri="urn:mpeg:dash:event:callback:2015"
value="1"/>
        <EventStream
          schemeIdUri="urn:mpeg:dash:event:callback:2015"
          timescale="1" value="1">
        <Event presentationTime="0" id="0"
          messageData="http://adserver.com/startPixel.gif"/>
        <Event presentationTime="75" id="0"
          messageData="http://adserver.com/firstQuartilePixel.gif"/>
        <Event presentationTime="150" id="0"
          messageData="http://adserver.com/midpointPixel.gif"/>
        <Event presentationTime="225" id="0"
          messageData="[http://adserver.com/thirdQuartilePixel.gif"/>
        <Event presentationTime="300" id="0"
          messageData="[http://adserver.com/completePixel.gif"/>
```

-continued

```
</EventStream>
    <! -- Default content, may be replaced by elements from remote entity
-->
    <AdaptationSet mimeType="video/mp4" codecs="avc1.640828"
        frameRate="30000/1001"
        segmentAlignment="true" startWithSAP="1">
        <BaseURL availabilityTimeOffset="INF">default_ad/</BaseURL>
        <SegmentTemplate timescale="90000"
initialization="$Bandwidth%/init.mp4v"
        media="$Bandwidth%/$Time$.mp4v"/>
        <Representation id="v0" width="320" height="240"
bandwidth="250000"/>
        <Representation id="v1" width="640" height="480"
bandwidth="500000"/>
        <Representation id="v2" width="960" height="720"
bandwidth="1000000"/>
    </AdaptationSet>
  </Period>
  <!-Movie, cont'd -->
  <Period duration="PT1800S" " id="M2">
    <AssetIdentifier schemeIdUri="urn:org:example:asset-id:2013"
        value="md:cid:EIDR:10.5240%2f0EFB-02CD-126E-8092-1E49-W">
        <AdaptationSet mimeType="video/mp4" codecs="avc1.640828"
frameRate="30000/1001"
        segmentAlignment="true" startWithSAP="1">
        <BaseURL>video_2/</BaseURL>
        <SegmentTemplate timescale="90000"
initialization="$Bandwidth%/init.mp4v"
        media="$Bandwidth%/$Time$.mp4v"/>
        <Representation id="v0" width="320" height="240"
bandwidth="250000"/>
        <Representation id="v1" width="640" height="480"
bandwidth="500000"/>
        <Representation id="v2" width="960" height="720"
bandwidth="1000000"/>
    </AdaptationSet>
  </Period>
</MPD>
```

A framework is provided for insertion of HTTP headers in DASH, for example, by using a HeaderParam element, by modifying a UrlQueryInfo element, etc. An example modification of UrlQueryInfo is presented below. HeaderParam and/or a modified UrlQueryInfo may be used for headers. A modified UrlQueryInfo may allow URL parameter addition to XLink and/or event HTTP GET requests.

An "UrlQueryInfo" element (e.g., real-time and instantiation) may be used to provide a name/value functionality. This element may be carried at any level in an MPD (e.g., MPD, Period, AdaptationSet, Representation, SubRepresentation) and may be embedded into a (e.g., any) HTTP URL that may be used for retrieving se idents, resolving XLink, resolving template parameters and/or resolving other header values.

A UrlQueryInfo element may be modified, for example, to create a unified implementation with generic URL parameters. Table 2 shows an example of semantics for a modified UrlQueryInfo element.

TABLE 2

| Element or Attribute Name | Use | Description |
|---|---|---|
| UrlQueryInfo | | provides URL query string information |
| @queryTemplate | O (string) | provides URL parameters template information This string may (e.g., shall) comprise (e.g., contain) one or more $<ParamIdentifier>$ template identifiers. Template identifiers may (e.g., will) be replaced, for example, to build a query string. $<ParamIdentifier>$ may be replaced with an empty string. A template having an opening $ without a matching closing $, may be undefined, and a client may (e.g., will) act as if it did not understand the EssentialProperty's scheme. When selection of URL parameters is enabled through the use of $query:param$ template identifiers, URL parameters may (e.g., shall) be defined as name = value pairs separated by &. |
| @useMPDUrlQuery | O (bool) default:false | indicates that the URL parameters of the MPD URL may be (e.g., are) used in the construction of media segment URLs. This flag may (e g., may only) be present when the MPD is delivered over HTTP, and may default |

TABLE 2-continued

| Element or Attribute Name | Use | Description |
|---|---|---|
| | | to "false" when tire MPD is not delivered over HTTP. NOTE - simple parameter signaling may be used ("a = X&b = Y"), as well as scheme-dependent signaling ("a = $urn:XYZ$&b = $urn:ABC$"). When scheme-dependent signaling is used, the scheme may (e.g., shall) be inserted between two enclosing $ characters. |
| @queryString | O (string) | provides a query string to be used in the construction of media segment URLs. NOTE - simple parameter signaling may be used ("a = X&b = Y"), as well as scheme-dependent signaling ("a = $urn:XYZ$&b = $urn:ABC$"). When scheme-dependent signaling is used, the scheme may (e.g., shall) be inserted between two enclosing $ characters. |
| @xlink:href | O | specifies a reference to a remote UrlQueryInfo element |
| @xlink:actuate | OD default:onRequest | specifies the processing instructions, which may be, for example, "onLoad" or "onRequest." This attribute may (e.g., shall) not be present, for example, when the @xlink:href attribute is not present. |
| @includeInRequests | OD | Specify which URL requests may (e.g., should) carry these parameters. Values may be a list of "segment" (e.g., all segment URLs)", "xlink" (e.g., all XLink URLs), "mpd" (e.g., all MPD requests), and "event" (e.g., all HTTP GET requests triggered by DASH events), or any combination of these. Default value may be (e.g., is) "segment." Parameters may (e.g., will) be sent (e.g., only sent) with segment requests |
| @useInDomain | OD | List of domains to which these parameters may be sent (e.g., all by default). |

Legend:

For attributes: M = Mandatory, O = Optional, OD = Optional with Default Value, CM = Conditionally Mandatory.

For elements: <minOccurs> . . . <maxOccurs> (N = unbounded)

Note that the conditions may hold (e.g., only holds) without using xlink:href. Attributes (e.g., all attributes) may be (e.g., are) "optional" and <minOccurs = 0>, for example, when linking is used.

Elements are bold; attributes are non-bold and preceded with an @.

Parameter instantiation (e.g., generating a name and a corresponding value) may, for example, follow a specification, e.g., ISO/IEC 23009-1 Annex I. Instantiation may occur, for example, as a result of a URL redirect for an MPD, as a result of XLink resolution, as a result of client-side computation or a string may appear verbatim in an element.

An example of behavior in a multi-parameter scenario is described. A UrlQueryInfo element may, for example, allow carriage of a list of parameters, which may be presented as an ampersand-separated list of parameters. Translation from the string into HTTP header parameters when the computed string comprises a list of parameters, e.g., multiple ampersand-separated values, may be performed as follows: an (e.g., each) "&" (ampersand) character may be replaced by a carriage return (CR) character followed by a fine feed (LF) character, which may result in a list of "key" or "key=value" lines. A (e.g., each) line may be further processed, for example, as indicated below.

A line that comprises an (equal sign) character may be replaced by ":" (colon) followed by a " " (space) character. A line that does not comprise an '=' (equal sign) character, may have a ":" (colon) added to the end of the line (e.g., after the last character and before the CR character). A line that is a "key=value" string may be replaced with "key: value-CRLF"

In an example, a query string may be "token=1234&ip=1.2.3.4." The query string may be defined using a modified version of UrlQueryInfo element, for example, as disclosed herein. The query string may be used for HTTP header parameter insertion. For example, a header portion of an HTTP GET request may comprise, for example, "token: 1234" and "ip: 1.2.3.4" when the query string is used for HTTP header parameter insertion.

URL parameters (e.g., as defined in 23009-1 Annex I) may be used with (e.g., included in) XLink and/or event requests. The ability to use URL parameters with XLink and/or event requests may be enabled by the inclusion of the @includeInRequests attribute in the modified definition of UrlQueryInfo.

While HTTP is given as an example, other methods of providing a request with a URI identifying, for example, a segments are contemplated. For headers, a request header may allow insertion of custom headers. Requests may be used for retrieval of a subsegment, segment, or MPD, re-referencing of remote elements, or triggered by an event. The event may be embedded either in an MPD or in segments.

Figure 4A:
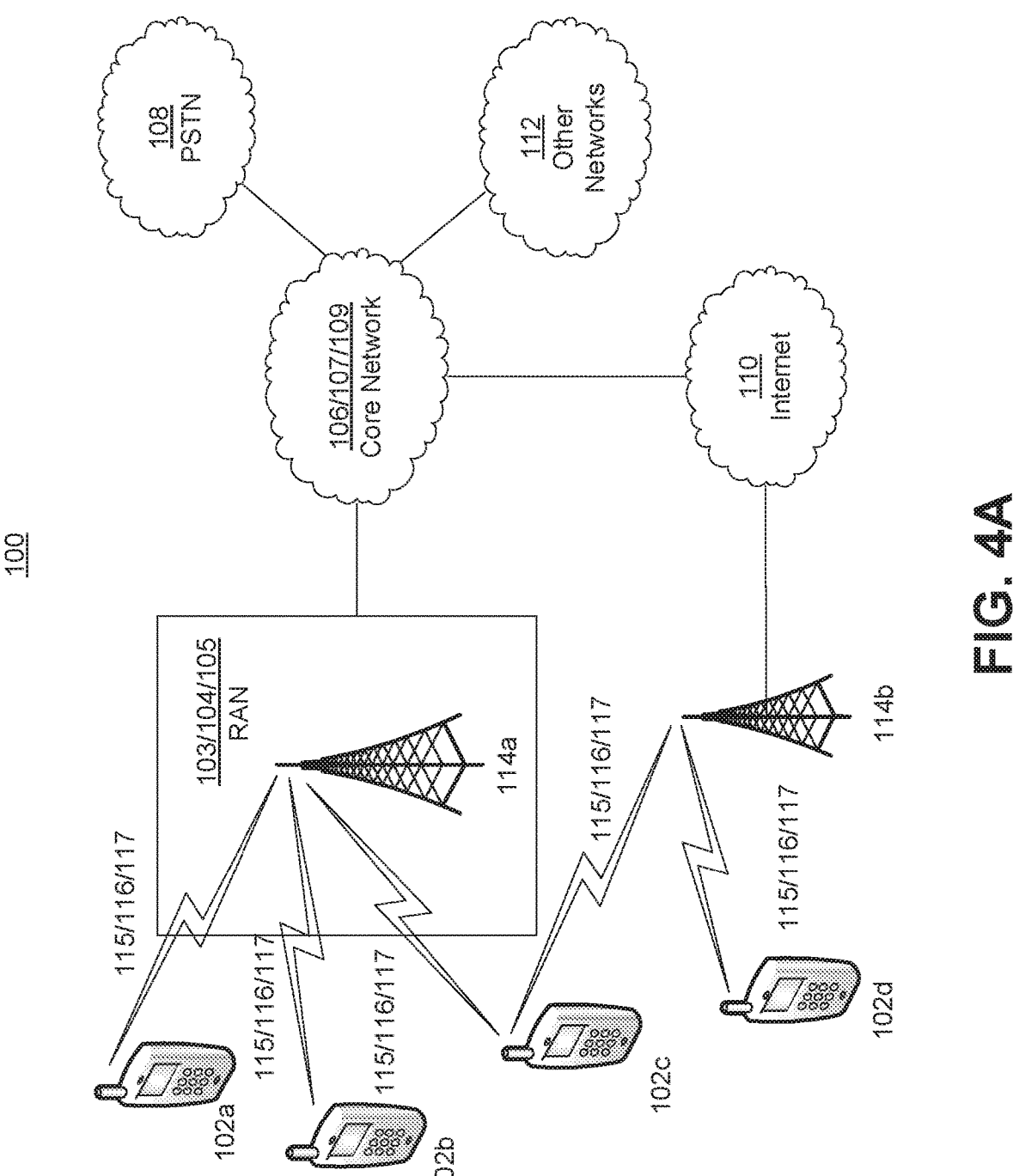
FIG. 4A is a system diagram of an example communications system in which disclosed technology be implemented.

FIG. 4A is a diagram of au example communications system 100 in which one or more disclosed techniques may be implemented. The communications system 100 may be a multiple access system that provides content, such as voice, data, video, messaging, broadcast, etc., to multiple wireless use is. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 4A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112 though it will be appreciated that the disclosed technology contemplates any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c. 1024 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include abase station 114a and abase station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 14b may be configured to transmit and/or receive wireless signals within a particular geographic region, which may be referred to as a cell (not shown). The cell may further be divided into cell sectors. For example, the cell associated with the base station 114a may be divided into three sectors. In an example, the base station 114a may include three transceivers, i.e., one for each sector of the cell. In an example, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA), WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an example, the base station 114a and the WTRUs 102a, 102b, 102c may implement a radio technology such as Evolved UNITS Terrestrial Radio Access (E-UTRA), which may establish the air interface 115/116/117 using Long Term Evolution (LTE) and/or LTE-Advanced (LTE-A).

In an example, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000) Interim Standard 95 (IS-95), Interim Standard 856 (15-856), Global System for Mobile communications (GSM), Enhanced Data rates for GSM Evolution (EDGE), GSM EDGE (GERAN), and the like.

The base station 114b in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In an example, the base station 114b and the WTRUs 102c, 102d may implement a radio technology such as IEEE 802.11 to establish a wireless local area network (WLAN). In an example, the base station 1146 and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 4A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internes protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 4A may be configured to communicate with the base station 114a, which may employ a cellular-based radio technology, and with the base station 114b, which may employ an IEEE 802 radio technology.

Figure 4B:
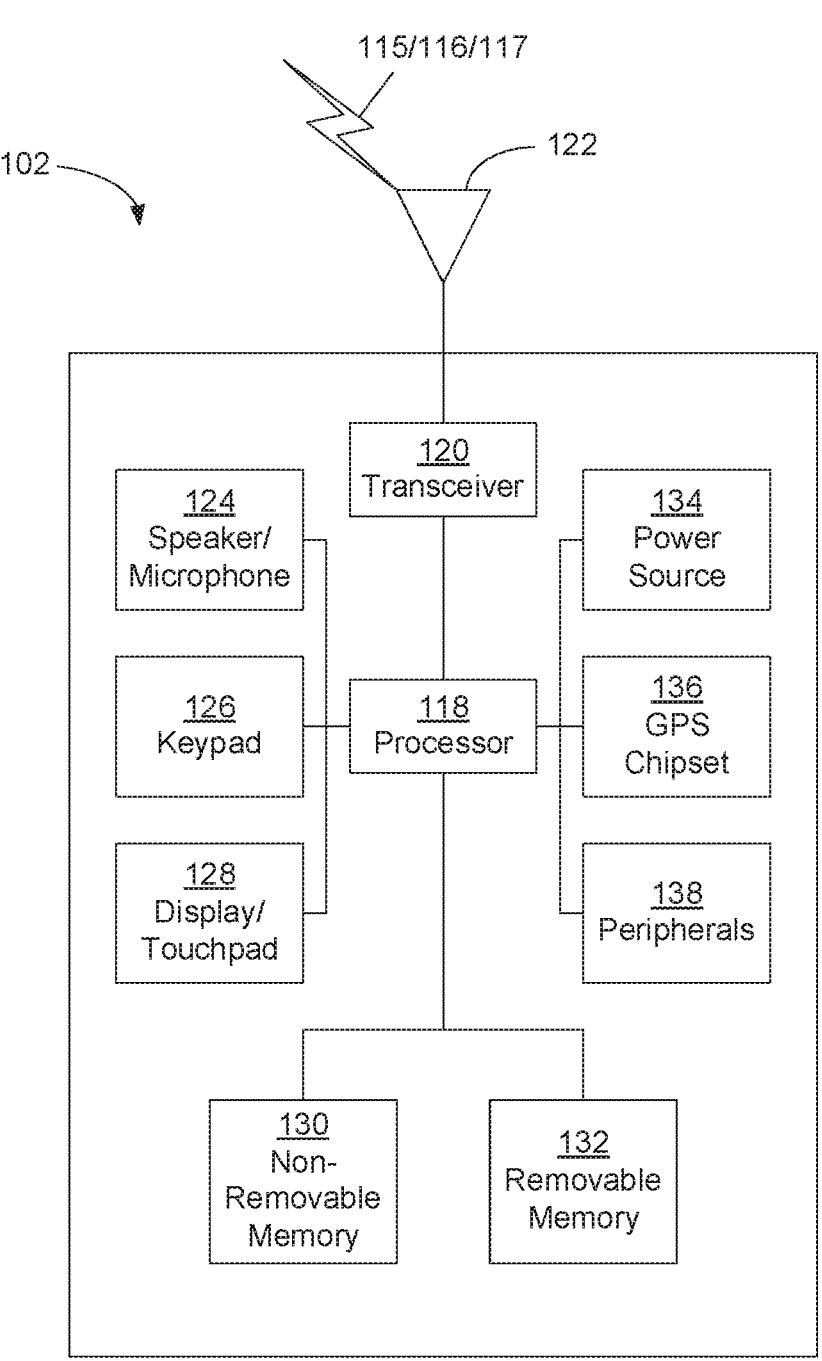
FIG. 4B is a system diagram of an example wireless transmit/receive unit (WTRU) that may be used within the communications system illustrated in FIG. 4A.

FIG. 4B is a system diagram of an example WTRU 102. As shown in FIG. 4B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements. Base stations 114a and 114b, and/or the nodes that base stations 114a and 114b, may represent, for example but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 4B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 4B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air in interface 115/116/117. In an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 4B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an example, the processor 118 may access information from, and store data in, memory that is not physically located on the WTRU 102, such as on a server or a home computer (not shown).

The processor 118 may receive power from the power source 134, and may be configured to distribute and/or control the power to the other components in die WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination technique.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4C:
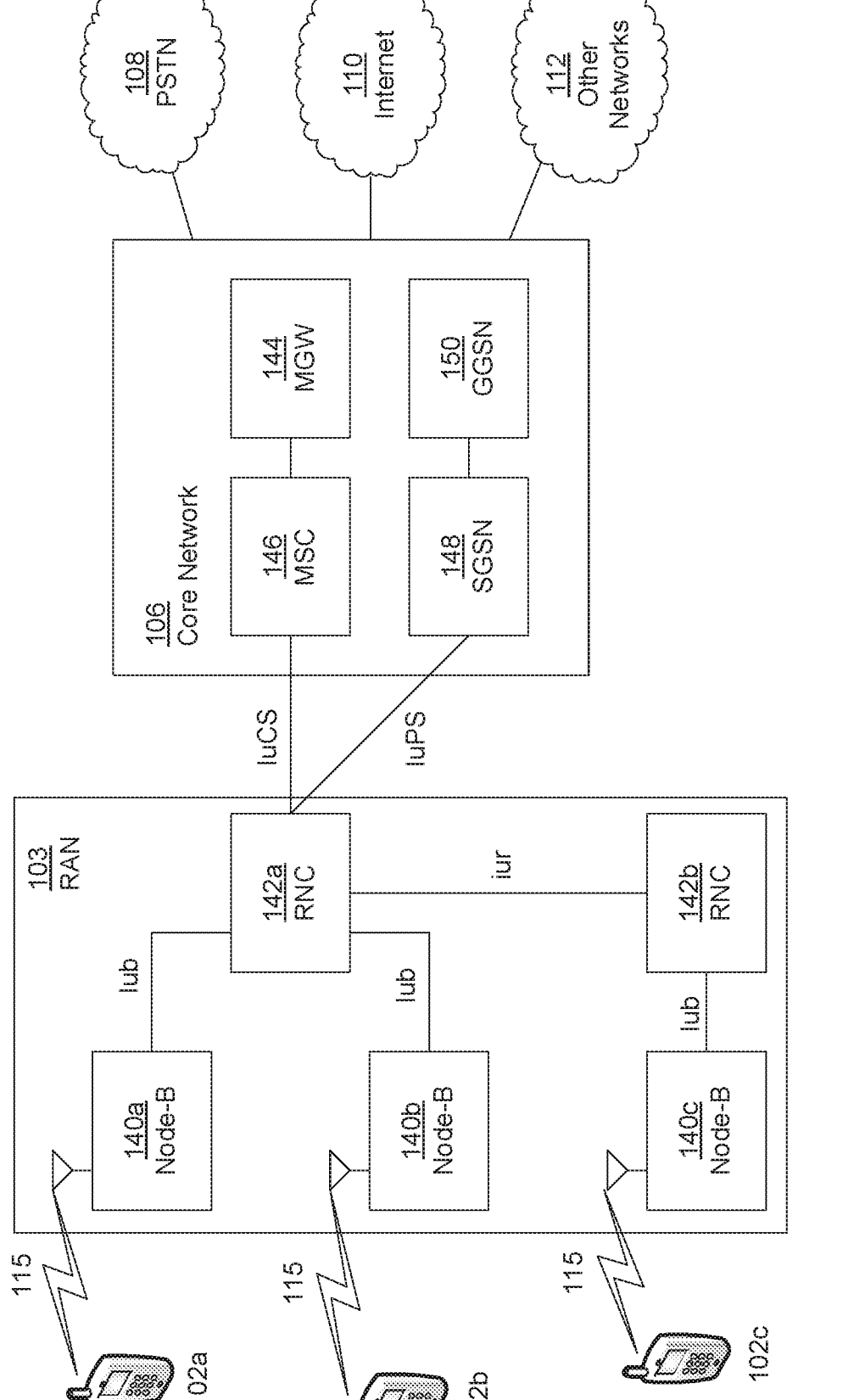
FIG. 4C is a system diagram of an example radio access network and an example core network that may be used within the communications system illustrated in FIG. 4A.

FIG. 4C is an example system diagram of the RAN 103 and the core network 106. As noted above, the RAN 103 may employ a UTRA radio technology to communicate with the WTRUs 102a, 102b, 102c over the air interface 115. The RAN 103 may also be in communication with the core network 106. As shown in FIG. 4C, the RAN 103 may include Node-Bs 140a, 140b, 140c, which may each include one or more transceivers for communicating with the WTRUs 102a, 102b, 102c over the air interface 115. The Node-Bs 140a, 140b, 140e may each be associated with a particular cell (not shown) within the RAN 103. The RAN 103 may also include RNCs 142a, 142b. It will be appreciated that the RAN 103 may include any number of Node-Bs and RNCs.

As shown in FIG. 4C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 4C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an LIPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, Which may include other wired or wireless networks that are owned and/or operated by other service providers.

Figure 4D:
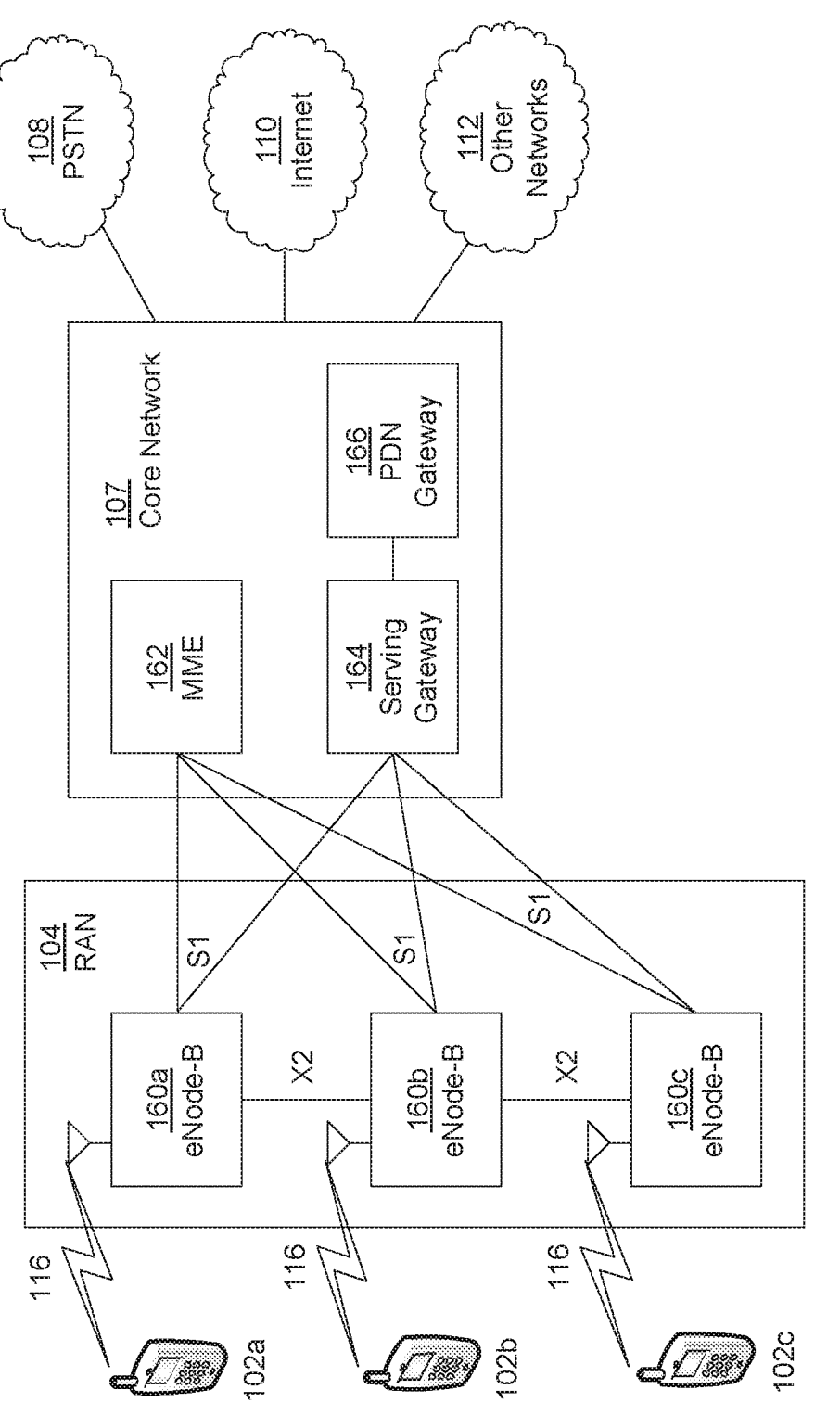
FIG. 4D is a system diagram of another example radio access network and another example core network that may be used within the communications system illustrated in FIG. 4A.

FIG. 4D is an example system diagram of the RAN 104 and the core network 107. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 4D, the eNode-Bs 160a, 160b, 160c may communicate with one another over an X2 interface.

The core network 107 shown in FIG. 4D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular sewing gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 4E:
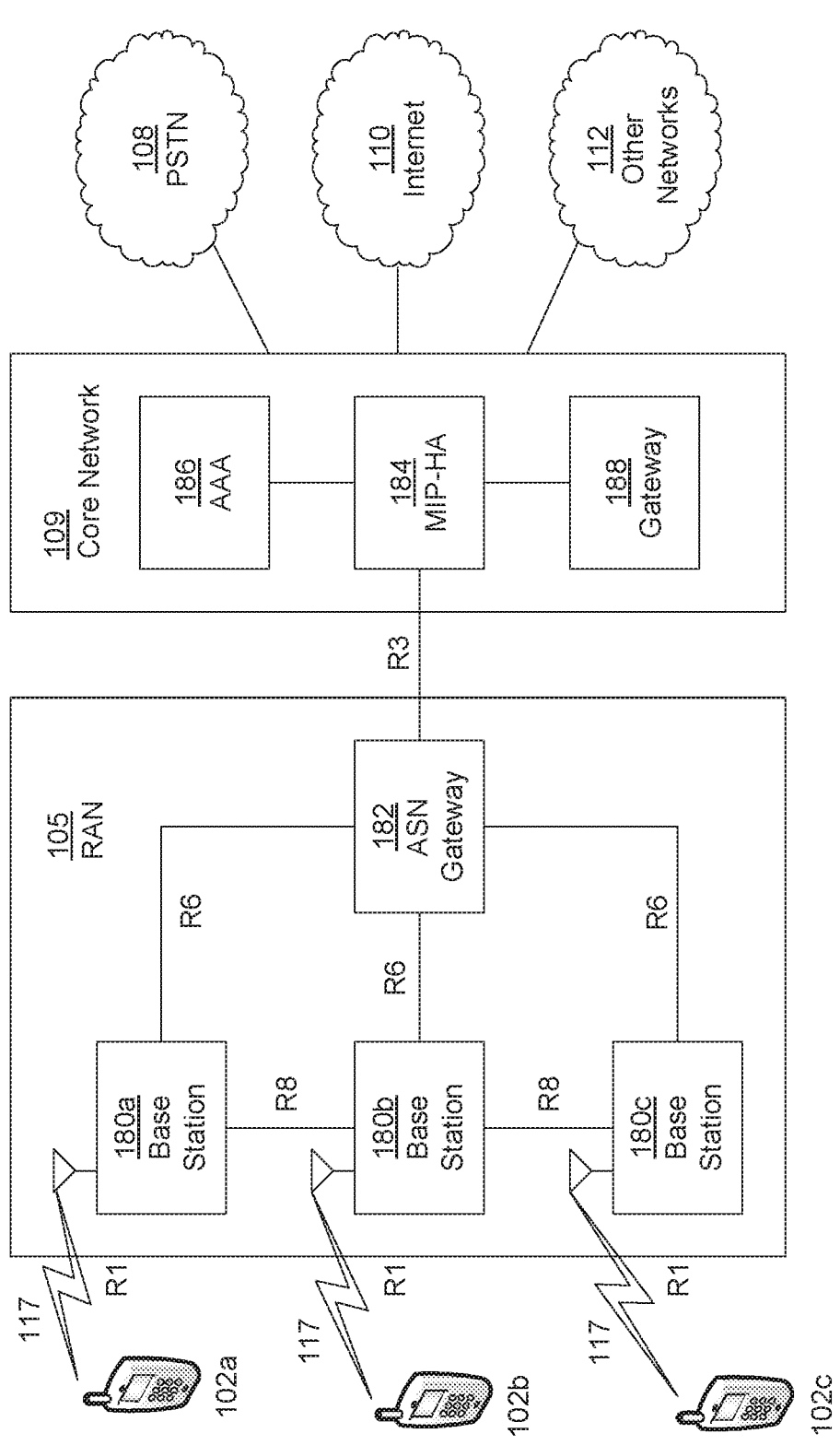
FIG. 4E is a system diagram of another example radio access network and another example core network that may be used within the communications system illustrated in FIG. 4A.

FIG. 4E is an example system diagram of the RAN 105 and the core network 109. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 4E, the RAN 105 may include base stations 180a, 180b, 180c, and an ASN gateway 182, though it will be appreciated that the RAN 105 may include any number of base stations and ASN gateways. The base stations 180a, 180b, 180c may each be associated with a particular cell (not shown) in the RAN 105 and may each include one or more transceivers for communicating with the WTRUs 102a, 102b, 102c over the air interface 117. In an example, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 inference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 4E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which tray include other wired or wireless networks that are owned and/or operated by other service providers.

Although not shown in FIG. 4E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in panic liar combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal had disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented on a dynamic adaptive streaming over hypertext transfer protocol (DASH) server for streaming content, the method comprising:

receiving, from a DASH client, a hypertext transfer protocol (HTTP) request, wherein the HTTP request is based on a request type associated with one or more request types of a media presentation description (MPD) file, and wherein the HTTP request indicates a request for a value parameter corresponding to a name parameter and value parameter pair feedback; and sending, to the DASH client, an HTTP response in reply to the HTTP request, wherein the HTTP response comprises a header indicating the requested value parameter corresponding to the name parameter and value parameter pair feedback, wherein the requested value parameter corresponding to the name parameter and value parameter pair feedback is indicated in a format based on a template associated with the request type, and wherein the requested value parameter is sent to the DASH client for use in header of a segment HTTP request.

2. The method of claim 1, further comprising sending the MPD file to the DASH client, wherein the MPD file indicates a request type attribute and a template attribute, wherein the request type attribute and the template attribute are to be used by the DASH client for the HTTP request and the HTTP response, wherein the request type attribute indicates the one or more request types to be used by the DASH client, and wherein the template attribute indicates the template to be used by the DASH client to obtain the value parameter corresponding to the name parameter and value parameter pair feedback.

3. The method of claim 1, further comprising receiving, from the DASH client, the segment HTTP request, wherein the header of the segment HTTP request specifies the name parameter and the requested value parameter.

4. The method of claim 1, wherein the name parameter and value parameter pair feedback is in a uniform resource locator (URL) query form.

5. The method of claim 1, wherein the request type is a DASH event GET request.

6. The method of claim 1, wherein the MPD file comprises a plurality of request types indicating two or more of a DASH event GET request, an MPD GET request, or an XLink GET request.

7. The method of claim 1, wherein the request type is an XLink GET request or an MPD GET request.

8. A dynamic adaptive streaming over hypertext transfer protocol (DASH) server comprising:

a processor configured to at least:

receive, from a DASH client, a hypertext transfer protocol (HTTP) request, wherein the HTTP request is based on a request type associated with one or more request types of a media presentation description (MPD) file, and wherein the HTTP request indicates a request for a value parameter corresponding to a name parameter and value parameter pair feedback; and send, to the DASH client, an HTTP response in reply to the HTTP request, wherein the HTTP response comprises a header indicating the requested value parameter corresponding to the name parameter and value parameter pair feedback, wherein the requested value parameter corresponding to the name parameter and value parameter pair feedback is indicated in a format based on a template associated with the request type, and wherein the requested value parameter is sent to the DASH client for use in header of a segment HTTP request.

9. The DASH server of claim 8, wherein the processor is configured to send the MPD file to the DASH client, wherein the MPD file indicates a request type attribute and a template attribute, wherein the request type attribute and the template attribute are to be used by the DASH client for the HTTP request and the HTTP response, wherein the request type attribute indicates the one or more request types to be used by the DASH client, and wherein the template attribute indicates the template to be used by the DASH client to obtain the value parameter corresponding to the name parameter and value parameter pair feedback.

10. The DASH server of claim 8, wherein the processor is configured to receive, from the DASH client, the segment HTTP request, wherein the header of the segment HTTP request specifies the name parameter and the requested value parameter.

11. The DASH server of claim 8, wherein the name parameter and value parameter pair feedback is in a uniform resource locator (URL) query form.

12. The DASH server of claim 8, wherein the request type is a DASH event GET request.

13. The DASH server of claim 8, wherein the MPD file comprises a plurality of request types indicating two or more of a DASH event GET request, an MPD GET request, or an XLink GET request.

14. The DASH server of claim 8, wherein the request type is an XLink GET request or an MPD GET request.

15. A dynamic adaptive streaming over hypertext transfer protocol (DASH) client comprising a processor configured to at least:

receive a media presentation description (MPD) file for DASH streaming, wherein the MPD file indicates a request type attribute and a template attribute to be used by the DASH client for a hypertext transfer protocol (HTTP) request, wherein the request type attribute indicates a set of request types to be used by the DASH client, and wherein the template attribute indicates a template to be used by the DASH client to obtain a value parameter corresponding to a name parameter and value parameter pair feedback from an HTTP response in reply to an HTTP request;

generate, based on the request type attribute and the template attribute, a first HTTP request, wherein the first HTTP request indicates a request for the value parameter corresponding to the name parameter and value parameter pair feedback;

send the first HTTP request;

receive a first HTTP response in reply to the first HTTP request, wherein the first HTTP response comprises a header indicating the requested value parameter corresponding to the name parameter and value parameter pair feedback;

obtain, from the received first HTTP response, the requested value parameter, wherein the requested value parameter is obtained based on the template;

generate a second HTTP request for a segment, wherein header of the second HTTP request comprises the obtained value parameter using the received first HTTP response; and send the second HTTP request.

16. The DASH client of claim 15, wherein the request type attribute is one of an XLink GET request, an MPD GET request, or a DASH event GET request.

17. The DASH client of claim 15, wherein the request type attribute indicates a plurality of request types, and the plurality of request types comprises two or more of a DASH event GET request, an MPD GET request, or an XLink GET request.

18. The DASH client of claim 15, wherein the processor being configured to send the first HTTP request comprises the processor being configured to send the first HTTP request to a DASH value provider.

19. The DASH client of claim 15, wherein the processor being configured to send the second HTTP request comprises the processor being configured to send the second HTTP request to a DASH content server.

* * * * *